(12) United States Patent
Chen et al.

(10) Patent No.: US 7,101,922 B2
(45) Date of Patent: Sep. 5, 2006

(54) METHOD FOR PREPARING ELASTOMER/SILICA COMPOSITE

(75) Inventors: Sun-Lin Chen, Akron, OH (US); Howard Allen Colvin, Arlington, TX (US)

(73) Assignee: The Goodyear Tire & Rubber Company, Akron, OH (US)

( * ) Notice: Subject to any disclaimer, the term of this patent is extended or adjusted under 35 U.S.C. 154(b) by 382 days.

(21) Appl. No.: 10/308,596

(22) Filed: Dec. 2, 2002

(65) Prior Publication Data

US 2003/0119946 A1 Jun. 26, 2003

Related U.S. Application Data

(60) Provisional application No. 60/341,607, filed on Dec. 18, 2001.

(51) Int. Cl.
*C08J 3/215* (2006.01)
(52) U.S. Cl. .................. 523/334; 524/492; 524/502
(58) Field of Classification Search ............. 523/334; 524/492, 493, 495, 496, 502
See application file for complete search history.

(56) References Cited

U.S. PATENT DOCUMENTS 5,763,388 A 6/1998 Lightsey et al. ............ 523/212
6,025,415 A * 2/2000 Scholl ........................ 523/213
6,060,552 A 5/2000 Kaido ........................ 524/492
6,313,211 B1 * 11/2001 Scholl et al. ............... 524/492
6,407,153 B1 * 6/2002 von Hellens ................ 524/188

FOREIGN PATENT DOCUMENTS

| EP | 527396 | 2/1993 |
|----|--------|--------|
| EP | 1002836 | 5/2000 |
| EP | 1188786 | 3/2002 |

OTHER PUBLICATIONS

European Search Report.

\* cited by examiner

*Primary Examiner*—Tae H. Yoon
(74) *Attorney, Agent, or Firm*—Henry C. Young, Jr.

(57) ABSTRACT

This invention relates to the preparation of a silica reinforced elastomer via preparation of a silica-elastomer masterbatch as a composite of synthetic silica and an emulsion polymerization prepared synthetic elastomer. Such masterbatch is prepared by introducing such silica and a silane into a latex of the synthetic elastomer and recovering the composite thereof The invention further includes a rubber composition of at least two elastomers wherein at least one of said elastomers is such masterbatched composite. A tire having a component of such rubber composition, particularly a tire tread, is specifically contemplated.

8 Claims, No Drawings

METHOD FOR PREPARING ELASTOMER/SILICA COMPOSITE

The Applicants hereby incorporate by reference prior U.S. Provisional Application Ser. No. 60/341,607, filed on Dec. 18, 2001.

FIELD OF THE INVENTION

This invention relates to the preparation of a silica reinforced elastomer via preparation of a silica-elastomer masterbatch as a composite of synthetic silica and an emulsion polymerization prepared synthetic elastomer. Such masterbatch is prepared by introducing such silica and a silane into a latex of the synthetic elastomer and recovering the composite thereof The invention further includes a rubber composition of at least two elastomers wherein at least one of said elastomers is such masterbatched composite. A tire having a component of such rubber composition, particularly a tire tread, is specifically contemplated.

BACKGROUND OF THE INVENTION

Elastomers are conventionally reinforced with particulate reinforcing fillers such as, for example, carbon black and sometimes synthetic amorphous silica, usually precipitated silica aggregates.

Such synthetic silica aggregates are normally highly hydrophilic in nature and have a strong tendency to form agglomerates of the aggregates.

Usually a coupling agent is also added to the rubber composition to aid in coupling the silica to the one or more of the diene-based elastomers contained in the rubber composition. Alternately, an alkoxysilane hydrophobating agent for the silica may also be added to the rubber composition or the silica may be pre-treated with such coupling agent and/or alkoxysilane hydrophobating agent.

In practice, the rubber composition is usually subjected to several sequential high shear, high temperature, mixing steps in which the silica agglomerates are substantially physically broken down and thereby substantially reduced to the aforesaid basic silica aggregates.

Masterbatches, or pre-formed mixtures, of carbon black and rubber have sometimes been suggested and/or used for the preparation of various rubber compositions. Often such masterbatches are prepared by introducing water slurries of carbon black to an aqueous rubber latex, followed by coagulating and recovering the resulting composite for use in blending with a respective rubber composition.

Masterbatches of silica and rubber have also been suggested for similar purposes where the masterbatch is created by blending silica and an aqueous rubber latex, followed by recovering the resulting blend of silica and rubber.

However, because the precipitated silica aggregates are typically hydrophilic in nature and therefore have an affinity to water, the silica aggregates typically become more associated with the water of the latex than with the rubber itself. Accordingly, it is considered herein that it is difficult to adequately disperse such hydrophilic silica within a rubber by introducing the silica to the rubber in its aqueous latex form.

Accordingly, various methods have been offered to more efficiently provide dispersions of silica in a rubber latex.

For example, it has been proposed to incorporate silica into a rubber latex by (A) treating a silica with coupling agent in a aqueous suspension to form a compatibilized silica slurry, said coupling agent being an organosilane silicon compound having the capability of chemically reacting with the surface of the silica to bond the coupling agent thereto, and (B) contacting the rubber latex with the treated silica slurry whereby the silica is substantially uniformly distributed through the latex. For example, see U.S. Pat. No. 5,763,388.

Historically, precipitated silica aggregates are sometimes formed by acid-coagulating a silicate from a basic solution thereof, such as, and only as an example, treating sodium silicate, formed from silica and sodium hydroxide, with sulfuric acid, in the presence of a suitable electrolyte, under controlled conditions such as for example controlled temperature and controlled sequential order and rate of addition of materials. It is envisioned herein that colloidal elemental particles of silica are thereby formed which readily aggregate to from colloidal silica aggregates thereof and which are thereafter recovered from such colloidal mixture by precipitation of the silica aggregates therefrom to form a filtercake thereof which is washed with water, which might also include an electrolyte, and finished by drying techniques.

It is understood that such colloidal silica may negatively charged or positively charged, depending somewhat upon the specific manufacturing method used to form the colloidal silica.

Such colloidal silica, whether in a form of said formative elemental particles of silica and/or silica aggregates thereof, preferably in a form of colloidal silica aggregates, and prior to said recovery thereof by precipitation from said colloidal mixture, is referred to herein as "colloidal silica" which may be in an unprecipitated colloidal/dispersion state of aggregates of primary silica particles having hydroxyl groups (e.g. silanol groups) on their surfaces.

For this invention, it is desired to prepare a composite of silica and diene-based rubber by mixing an aqueous dispersion of well dispersed, negatively charged colloidal silica with a diene-based rubber latex and discrete domains (droplets) of a negatively charged oil emulsion of an organosilane followed by co-coagulating the mixture with the aid of a suitable coagulant to form a silica/rubber/silane composite.

By such method it is envisioned that a novel composite of silica and diene-based rubber is formed with relatively homogeneously dispersed silica aggregates therein and with a minimum of premature silane hydrolysis and network formation in the elastomer host.

In the description of this invention, the term "phr" where used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

SUMMARY AND PRACTICE OF THE INVENTION

In accordance with this invention, a method is provided for preparing a composite comprised of at least one elastomer and a homogeneously dispersed silica reinforcement therein which comprises, based upon parts by weight of an ingredient per 100 parts by weight rubber which comprises:

(A) preparing a water dispersion of a composite formed by blending an aqueous colloidal silica slurry, rubber latex comprised of colloidal elastomer particles therein and a pre-formed emulsion of oil and an organosilane by blending:

(1) an aqueous suspension of a negatively charged colloidal silica aggregates which contains from about 10 to about 100 phr of silica aggregates therein, (2) an aqueous rubber latex which contains 100 phr of diene-based rubber colloidal particles therein, and (3) oil emulsion of an organosilane polysulfide having from 2 to 6, with an average of from 2 to 2.6 or from 3.5 to 4, sulfur atoms in its polysulfidic bridge, which contains from zero to about 4, alternatively about 0.4 to about 4, phr of said organosilane polysulfide therein, wherein said organosilane component of said organosilane polysulfide is reactive with silanol groups contained on the surface of said silica aggregates, and (B) recovering said water dispersed product by coagulation.

It is contemplated that, in the formation of the rubber and silica masterbatch of this invention, the crosslinking (network) of organosilane with the silica aggregates and with the rubber molecules may tend to increase the viscosity, somewhat, of the resulting masterbatch of rubber and silica as compared to simply mixing a rubber latex and particles of silica aggregates.

It is further contemplated that because the silica aggregates are highly hydrophilic in nature and therefore have a natural tendency to agglomerate together, the practice of this invention tends to overcome, or at least substantially reduce, such tendency and thereby achieve both an improved dispersion of the silica aggregates with the rubber host as well as tending to bond such highly dispersed silica aggregates to the rubber itself by the inclusion of the organosilane polysulfide/oil emulsion in the process of this invention.

In the practice of the invention, said oil emulsion of an organosilane polysulfide is comprised of an oil in which said organosilane polysulfide is emulsified and the emulsion is in the form of individual domains, usually droplets thereof in said rubber composite. In practice, an oil may be used which is chemically inert insofar as said organosilane polysulfide is concerned. For example, a rubber processing oil might be used so long as it is chemical inert insofar as said organosilane polysulfide.

A purpose of providing said organosilane polysulfide as an oil emulsion thereof is to protect the organosilane from hydrolysis which would otherwise be expected upon exposure to the water of the aqueous emulsion (latex) of the colloidal diene rubber particles.

Representative of organosilane polysulfides for use in this invention are, for example, organosilane polysulfides of the general formula (I):

(OR)$_3$—Si—R'—S$_x$—R'—Si—(OR)$_3$ (I)

wherein R is selected from at least one of methyl and ethyl radicals and R' is an alkylene radical having from 1 to 12 carbon atoms, preferably selected from ethylene, propylene and butylene radicals and x is a value of from 2 to 6 and an average of from 2 to 2.6 or from 3.5 to 4.

It is to be appreciated that an activity of a organosilane polysulfide of Formula (I) having an average of 2 to 2.6 connecting sulfur atoms in its polysulfidic bridge may be very different from the activity such organosilane polysulfide having an average of from 3.5 to 4 connecting sulfur atoms in its polysulfidic bridge, insofar as generating free sulfur, and therefor being a sulfur donor, within the rubber composite is concerned.

In particular, the sulfur atoms of an organosilane disulfide type of material containing an average of only 2 to 2.6 sulfur atoms in its polysulfidic bridge is primarily a disulfide and its sulfur-to-sulfur bonds are considered as being much stronger than such an organosilane polysulfide having from 3.5 to 4 connecting sulfur atoms in its polysulfidic bridge. Thus, the organosilane polysulfide material with the larger polysulfidic bridge can be somewhat of a sulfur donor (a provider of free sulfur) in a rubber composition at elevated temperatures whereas the sulfur atoms of the smaller polysulfidic bridge are not considered herein to be such a sulfur donor, at least to the extent of the organosilane polysulfide with the larger polysulfidic bridge. This phenomenon can have a substantial effect upon a formulation of a sulfur curable rubber composition.

Representative examples of such organosilane polysulfides having two connecting sulfur atoms in its polysulfidic bridge are, for example are 2,2'-bis(trimethoxysilylethyl) disulfide, 3,3'-bis(trimethoxysilylpropyl)disulfide, 3,3'-bis (triethoxysilylpropyl)disulfide, 2,2'-bis(triethoxysilylethyl) disulfide, 2,2'-bis(tripropoxysilylethyl)disulfide, 2,2'-bis(tri-sec.butoxysilylethyl)disulfide, 3,3'-bis(tri-t-butoxyethyl) disulfide, 3,3'-bis(triethoxysilylethyl tolylene)disulfide, 3,3'-bis(trimethoxysilylethyl tolylene)disulfide, 3,3'-bis (triisopropoxypropyl)disulfide, 3,3'-bis(trioctoxypropyl) disulfide, 2,2'-bis(2'-ethylhexoxysilylethyl)disulfide, 2,2'-bis (dimethoxy ethoxysilylethyl)disulfide, 3,3'-bis (methoxyethoxypropoxysilylpropyl)disulfide, 3,3'-bis (methoxy dimethylsilylpropyl)disulfide 3,3'-bis (cyclohexoxy dimethylsilylpropyl)disulfide, 4,4'-bis (trimethoxysilylbutyl)disulfide, 3,3'-bis(trimethoxysilyl-3-methylpropyl)disulfide, 3,3'-bis(tripropoxysilyl-3-methylpropyl)disulfide, 3,3'-bis(dimethoxy methylsilyl-3-ethylpropyl)disulfide, 3,3'-bis(trimethoxysilyl-2-methylpropyl)disulfide, 3,3'-bis(dimethoxyphenylsilyl-2-methylpropyl)disulfide, 3,3'-bis(trimethoxysilylcyclohexyl) disulfide, 12,12'-bis (trimethoxysilyldodecyl)disulfide, 12,12'-bis(triethoxysilyldodecyl)disulfide, 18,18'-bis(trimethoxysilyloctadecyl)disulfide, 18,18'-bis(methoxydimethylsilyloctadecyl)disulfide, 2,2'-bis(trimethoxysilyl-2-methylethyl)disulfide, 2,2'-bis(triethoxysilyl-2-methylethyl) disulfide, 2,2'-bis(tripropoxysilyl-2-methylethyl)disulfide, and 2,2'-bis(trioctoxysilyl-2-methylethyl)disulfide.

Representative of such organosilane disulfides having about two connecting sulfur atoms in the polysulfidic bridge are bis-(3-trimethoxysilylpropyl)disulfide, bis-(3-triethoxysilylpropyl)disulfide, bis-(3-methoxy dimethylsilylpropyl) disulfide, and bis-(3-cyclohexoxy dimethylsilylpropyl)disulfide.

Representative of such organosilane polysulfides having three or four connecting sulfur atoms in the polysulfidic bridge are, for example, bis-(3-trimethoxylsilylpropyl) trisulfide, bis-(3-trimethoxylsilylpropyl) tetrasulfide, bis-(3-triethoxysilylpropyl)trisulfide, bis-(3-triethoxysilylpropyl) tetrasulfide, bis-(3-triethoxysilylethyltolylene)trisulfide, and bis-(3-triethoxysilylethyltolylene)tetrasulfide.

In one aspect of the invention, the organosilane polysulfide material is bis-(3 triethoxysilylpropyl)polysulfide having in a range of 2 to 8 with an average of from 2 to 2.6 connecting sulfur atoms in its polysulfidic bridge and therefor is somewhat of a disulfide material in which only a minimal amount of sulfur atoms become free sulfur atoms during ordinary mixing thereof with the rubber. Therefore, little viscosity increase of the rubber composition may be attributable to the inclusion of such alkylsilane polysulfide in the rubber composite of this invention.

Also, alternatively, the organosilane polysulfide is bis-(3 triethoxysilylpropyl)polysulfide having in a range of from 2 to 8 with an average of from 3.5 to 4 connecting sulfur atoms in its polysulfidic bridge and therefor is somewhat of a tetrasulfide material in which free sulfur atoms may be generated during ordinary mixing thereof with the rubber. Therefore, it would be expected that a degree of viscosity increase of the rubber composition may be attributable to the inclusion of such alkylsilane polysulfide in the rubber composite of this invention.

It is an important aspect of this invention that the aqueous colloidal dispersion of the silica aggregates are negatively charged in order to avoid a premature coagulation of the rubber latex, composed of negatively charged elastomer particles, with which the aqueous dispersion of colloidal silica aggregates are blended.

It is also considered herein that it is desired that the value of the pH of the colloidal dispersion is greater than 4, and desirably in a range of from about 5 to about 10.

The blend of the aqueous colloidal silica aggregates, aqueous suspension or emulsion of colloidal diene hydrocarbon based rubber particles and oil based emulsion of independent domains of the alkylsilane polysulfide may, in general, be coagulated, for example, by addition of conventional polyamine coagulants used for rubber lattices.

The rate of coagulation of the above materials from their respective colloidal, suspension and emulsion forms are desirably of about the same order of magnitude in order that the silica particles, as well as the associated alkylsilane polysulfide which is reactive with hydroxyl groups contained on the surface of the silica, be relatively evenly distributed, as a dispersion, throughout the elastomer host.

In the practice of the invention, various diene-based rubber lattices may be used which have been prepared, for example, by conventional aqueous emulsion polymerization, although naturally occurring natural cis 1,4-polyisoprene rubber may also be used. Accordingly, representative examples of such lattices are lattices of diene-based rubbers exemplary of which are cis 1,4-polyisoprene natural rubber, aqueous polymerization derived styrene/butadiene copolymer elastomers as well as chloroprene and butadiene/acrylonitrile copolymer elastomers.

While natural cis 1,4-polisoprene rubber may be used in its natural latex form, synthetic lattices of other rubbers may also be used such as, for example, the hereinbefore mentioned synthetic rubber lattices.

The synthetic rubber lattices can be prepared by conventional means such as for example, polymerizing isoprene, 1,3-butadadiene monomers with or with out the presence of a styrene monomer in an aqueous medium comprised of water, surfactant and suitable free radical initiator as is well known to those having skill in such art.

In further accordance with this invention, a rubber composition prepared according to the process of this invention is provided.

In additional accordance with this invention, an article is provided having at least one component comprised of said rubber composition.

In further accordance with this invention, said article is selected from industrial belts and hoses.

In additional accordance with this invention, a tire is provided having at least one component comprised of said rubber composition.

In further accordance with this invention, a tire is provided having a tread comprised of said rubber composition.

It is to be appreciated that additional reinforcing fillers may also be subsequently mixed with the elastomer composition.

For example, such additional fillers may be carbon black, precipitated silica and other fillers containing hydroxyl groups on their surface such as, for example, aluminum doped precipitated silica and carbon blacks having silica domains on their surface.

Exemplary of such aluminum doped precipitated silicas are, for example aluminosilicates formed by a co-precipitation of a silicate and an aluminate. An example of modified carbon black is, for example, a carbon black having silicon hydroxide on its outer surface by treatment of carbon black with an organosilane at an elevated temperature or by co-fuming an organosilane and oil at an elevated temperature.

In further accordance with this invention, an elastomer blend composition is provided which is comprised of at least two diene-based elastomers of which one elastomer is a pre-formed composite of rubber and silica prepared by the process of this invention comprised of, based on 100 phr of elastomers, (A) about 10 to about 90 phr of at least one diene-based elastomer selected from at least one homopolymer and copolymer of isoprene and 1,3-butadiene, and a copolymer of at least one diene selected from isoprene and 1,3-butadiene with a vinyl aromatic compound selected from at least one of styrene and alpha-methylstyrene, preferably styrene, (B) about 90 to about 10 phr of at least one of said pre-formed composite rubber and silica, (C) at least one of additional reinforcing filler provided, however, that the total of silica in said pre-formed composite of rubber and silica and said additional reinforcing filler are present in an amount of from about 30 to about 120 phr and where said additional reinforcing filler may be selected, for example, from at least one of precipitated silica, aluminosilicate, carbon black and modified carbon black having silica domains on its surface, wherein said silica and said silica domains, contain hydroxyl groups, e.g. silanol groups, on its surface and (D) optionally a coupling agent having a moiety reactive with said filler(s) and another moiety interactive with said elastomer(s).

In further accordance with this invention, an article is provided having at least one component comprised of said rubber blend composition.

In additional accordance with this invention, an article selected from industrial belts and hoses is provided having at least one component comprised of said rubber blend composition.

In further accordance with this invention, a tire is provided having at least one component comprised of said rubber blend composition.

In additional accordance with this invention, a tire is provided having a tread comprised of said rubber blend composition.

Representative of additional elastomers which may be mixed with the pre-formed composite of rubber and silica of this invention are, for example, cis 1,4-polyisoprene, cis 1,4-polybutadiene, isoprene/butadiene copolymers, styrene/butadiene copolymers, including emulsion polymerization prepared copolymers and organic solvent solution polymerization prepared copolymers, styrene/isoprene copolymers, 3,4-polyisoprene, trans 1,4-polybutadiene, styrene/isoprene/butadiene terpolymer, high vinyl polybutadiene having from about 35 to about 90 percent vinyl groups, and mixtures thereof; as well, as terpolymers of ethylene, propylene, and minor amount of non-conjugated diene such as, for example, dicyclopentadiene, norbornene, and hexadiene, as well as, copolymers of isobutylene and a minor amount of conjugated diene such as, for example, isoprene and such copolymers which have been halogenated with bromide or chlorine.

For the carbon black reinforcement having domains of silica on the surface thereof, such modified carbon black may be prepared, for example, by treatment of a reinforcing carbon black with an organo silane at an elevated temperature or by co-fuming an organo silane and an oil.

A particular advantage in using the aforesaid pre-formed rubber composite prepared in accordance with this invention which contains its own in-situ formed silica based reinforcement system within the rubber composition has been observed to be a significantly reduced mixing time for the rubber composition in an internal rubber mixer as well as a reduction of mixing energy required to produce such a composite with optimum, homogeneous reinforcement system dispersion, namely a more homogeneous dispersion within the elastomer host. This is desirable because it can both improve the processing of an elastomer composition during the mixing of the elastomer with other rubber compounding ingredients and, also various of the physical properties of the resulting rubber composition as well as various tire performances properties. Such improvements might be evidenced, for example in a reduction of a rubber composition's hysteresis and an improvement in a rubber composition's resistance to abrasion, apparently as a result of forming a more homogeneous dispersion of the in-situ formed reinforcement system and improvement in an efficiency of the interaction of the reinforcement system with the elastomer host which may be particularly significant for a tire tread rubber composition.

Classical rubber-reinforcing carbon blacks considered for use in this invention, including carbon blacks used for preparation of the carbon black composite, are, for example, carbon blacks having an Iodine Adsorption Number (ASTM test D1510) in a range of about 30 to about 180 and sometimes even up to about 250 g/kg and a DBP (dibutylphthalate) Adsorption Number (ASTM test D2414) in a range of about 20 to about 150 $cm^3/100$ g. Representative examples of such carbon blacks, and references to associated ASTM test methods, may be found, for example, in *The Vanderbilt Rubber Handbook,* 1990 Edition on Pages 416 through 418.

The rubber composite itself can also be provided as being a sulfur cured composition through vulcanization of the uncured elastomer composition. The sulfur curing is accomplished in a conventional manner, namely, by curing under conditions of elevated temperature and pressure for a suitable period of time.

The curatives for sulfur curing the rubber composition are curatives conventionally used for sulfur curable elastomers which typically include sulfur and one or more appropriate cure accelerators and sometimes also a retarder. Such curatives and use thereof for sulfur curable elastomer compositions are well known to those skilled in the art.

Sequential mixing processes for preparing sulfur curable rubber compositions in which elastomers and associated ingredients exclusive of curatives are first mixed in one or more sequential steps, usually called a "non-productive mixing step(s)" followed by a final mixing step for adding curatives, usually called a "productive mixing step", are also well known to those skilled in the art.

It is to be appreciated that additional silica, particularly precipitated silica, and/or carbon black might also be blended with the said composite of pre-formed reinforced elastomer and additional elastomer(s).

It is intended for the practice of this invention that the term "precipitated silica", when used herein, also includes precipitated aluminosilicates as a form of precipitated silica. The precipitated silicas are, for example, those obtained by the acidification of a soluble silicate, e.g. sodium silicate, generally exclusive of silica gels.

Such silicas might be characterized, for example, by having a BET surface area, as measured using nitrogen gas, preferably in the range of about 40 to about 600, and more usually in a range of about 50 to about 300 square meters per gram ($m^2/g$). The BET method of measuring surface area is described by Brunauer, Emmett and Teller: *Journal of American Chemical Society* (1938) Page 309. An additional reference might be DIN Method 66131.

The silica may also be typically characterized by having a DBP (dibutylphthalate) Absorption Number in a range of about 100 to about 400, and more usually about 150 to about 300 cc/100 g.

Additional commercially available precipitated silicas which may be considered for use in this invention are, for example, and without an intended limitation, silicas commercially available from PPG Industries under the Hi-Sil trademark with designations Hi-Sil210, Hi-Sil243, etc; silicas available from Rhodia with, for example, Zeosil 1165MP and Zeosil 165GR, and silicas available from Degussa AG with, for example, designations VN2 and VN3, 3370GR, etc. and from Huber as Zeopol 8745 and Zeopol8715.

Various couplers may be used and many are well known to those skilled in such art. For example bis(trialkoxysilylalkyl) polysulfides may be used which contain from two to about eight sulfur atoms in their polysulfidic bridge, with an average of about 2 to about 5 sulfur atoms. For example, the polysulfidic bridge may contain an average of from about 2 to 3 or 3.5 to 5 sulfur atoms. The alkyl groups may be selected, for example, from methyl, ethyl, and propyl groups. Therefore, a representative coupler might be, for example, a bis(triethoxysilylpropyl) polysulfide containing from 2 to 8, with an average of about 2 to about 5, sulfur atoms in its polysulfidic bridge.

It is to be appreciated that the coupler, if in a liquid form, might be used with or without a carbon black carrier. If it is added to the rubber composition as a composite with a carbon black carrier, such carbon black is usually to be included in the amount of carbon black accounted for in the rubber composition formulation.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders, and accelerators, processing additives, such as oils, resins including tackifying resins, silicas, and plasticizers, fillers, pigments, fatty acid, zinc oxide, waxes, antioxidants and antiozonants, peptizing agents, and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

In the preparation of the rubber composition typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), Pages 344 through 346. Typical amounts of antiozonants comprise about 1 to 5 phr.

Typical amounts of fatty acids, if used, which can include stearic acid, palmitic acid, linoleic acid or mixtures of one or more fatty acids, can comprise about 0.5 to about 5 phr.

Often stearic acid is used in a relatively impure state and is commonly referred to in the rubber compounding practice as "stearic acid" and is so referred to in the description and practice of this invention.

Typical amounts of zinc oxide comprise about 1 to about 5 phr. Typical amounts of waxes comprise about 1 to about 5 phr. Often microcrystalline waxes are used. Typical amounts of peptizers, if used, comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1 to about 2.5, sometimes from about 1 to about 2, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates, and xanthates. Preferably, the primary accelerator is a sulfenamide. If a second accelerator is used, the secondary accelerator is preferably a guanidine, dithiocarbamate or thiuram compound.

The presence and relative amounts of the above ingredients, other than carbon black and coupler, are not considered to be the primary subject of this invention which is more primarily directed to the preparation and use of the aforesaid pre-formed elastomer composite with the integral filler dispersion.

The ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage (s). The rubber, carbon black and coupling agent if used, are mixed in one or more non-productive mix stages. The terms "non-productive" and "productive" mix stages are well known to those having skill in the rubber mixing art.

In at least one of the non-productive (NP) mixing stages, the materials are thermomechanically mixed and the mixing temperature is allowed to reach a temperature of, for example, between 140° C. and 190° C.

The rubber composition of this invention can be used for various purposes. For example, it can be used for various tire compounds. Such tires can be built, shaped, molded and cured by various methods which are known and will be readily apparent to those having skill in such art.

EXAMPLE A

Preparation of Masterbatch of Silica, Coupler and SBR Rubber

A masterbatch was prepared by blending an aqueous emulsion of colloidal silica particles, an oil emulsion of coupling agent and an aqueous emulsion of styrene/butadiene elastomer particles, followed by recovering a dried masterbatch was prepared as follows and identified herein as SCRMB (silica, coupler and rubber masterbatch), with ingredients indicated in the following Table 1.

TABLE 1

| Ingredients | Parts |
|---|---|
| Colloidal silica emulsion[1] | 22.8 |
| Coupler/oil emulsion[2] | 14.4 |
| Coupler[3] | 4.1 |
| Oil[4] | 10 |
| SBR, in rubber latex[5] | 20 |
| Antidegradant[6] | 1.5 |

[1]Obtained as Tixosil SP 365 from Rhodia as an aqueous emulsion of synthetic colloidal precipitated silica particles which reportedly contained about 22 weight percent of said silica particles. The emulsion is reported in Table 1 as the dry weight of silica particle content.

[2]Reported on a basis of coupler and oil blended ingredients as discussed below and reported in Table 1 as the weight of coupler (about 4.1 parts) and oil (about 10 parts) of the blend exclusive of additional ingredients in the emulsion

[3]Liquid bis(3-triethoxysilylpropyl)disulfide understood to have an average of about 2.2 connecting sulfur atoms in the polysulfidic bridge obtained as Si-266 from Degussa

[4]Aromatic rubber processing oil

[5]Styrene/butadiene rubber aqueous latex obtained from the Goodyear Tire & Rubber Company which contained 20 parts by weight of the rubber and is reported in Table A as the dry weight of the SBR which contained about 23 weight percent bound styrene

[6]An antidegradant of the phenolic type and of the phosphite type obtained as Wingstay® and Polygard®, respectively, from The Goodyear Tire & Rubber Company The SCRMB was prepared by the following step-wise procedure:

(A) Dissolve the liquid coupling agent in the rubber processing oil in a high shear mixer, together with 0.5 parts of surfactant, 18 parts water and about 0.1 parts of sodium hydroxide (10 percent) to form an emulsion of the coupling agent in the oil;

(B) Mix the prepared oil/coupler emulsion with the aqueous emulsion of colloidal silica particles;

(C) Mix the SBR emulsion with the above mixture of emulsions;

(D) Coagulate the resulting mixture with an addition of a solution composed of about 3 parts of polyamine and 2000 parts water; and (E) Wash (with water) and dry the coagulum (the SCRMB) at a temperature of about 60° C. for about 10 to 15 hours.

EXAMPLE B

Rubber compositions which contained silica and SBR were prepared and referred to herein as Control Sample X and Sample Y.

Control Sample Y contained the silica/oil/SBR masterbatch prepared according to Example A (the SCRMB).

For Control Sample X and Sample Y, the ingredients were blended in an internal mixer for about 2.5 minutes to a temperature of about 155° C. in the absence of sulfur and accelerator curatives. The resulting rubber composition was then blended with sulfur and accelerator curatives in an internal mixer for about 2 minutes to a lower temperature to prevent pre-curing the mixture.

Ingredients for Control Sample X and Sample Y are recited in the following Table 2.

TABLE 2

| Materials | Control Sample X | Sample Y |
|---|---|---|
| Styrene/butadiene rubber[1] | 100 | 0 |
| SCRMB[2] | 0 | 154.6 |
| Silica[3] | 42.86 | 0 |
| Silica coupler[4] | 1.71 | 0 |
| Zinc oxide | 1.5 | 1.5 |
| Stearic acid | 2 | 2 |
| Paraffinic oil | 10 | 0 |
| Accelerator(s)[5] | 3.05 | 1.5 |
| Sulfur | 1.6 | 1.8 |

[1]Styrene/butadiene rubber obtained by aqueous emulsion polymerization as PFL 1502 NN from the Goodyear Tire & Rubber Company which contained about 23 weight percent bound styrene
[2]The silica/coupler/rubber masterbatch prepared according to Example A which was comprised of about 26.6 weight percent silica, about 2.6 weight percent coupler, about 6.3 weight percent oil and about 63.3 weight percent of butadiene/styrene rubber.
[3]Synthetic precipitated silica aggregates obtained as Zeosil 1165MP from Rhodia
[4]Obtained from Degussa as Si266 as a liquid bis(3-triethoxysilylpropyl) polysulfide reported having an average of about 2.2 connecting sulfur atoms in its polysulfidic bridge
[5]Vulcanization accelerators of the diphenylguanidine and sulfenamide types.

Control Sample X and Sample Y were tested for physical properties and various physical properties are reported in the following Table 3.

TABLE 3

| | Control Sample X | Sample Y | Variance |
|---|---|---|---|
| RPA 505 (Rubber Property Analyzer) | | | |
| G' (100° C., 0.83 Hz, 15%, kPa) | 152 | 138 | (−9%) |
| Cure at 150° C. | | | |
| Minimum torque | 1.1 | 0.8 | |
| Maximum torque | 7.7 | 6.3 | |
| Delta torque | 6.6 | 5.8 | (−12%) |
| T90 (minutes) | 18.2 | 12.1 | |
| Cured G' (100° C., 1 Hz, 10%), kPa | 1005 | 862 | (−14%) |
| Tan delta | 0.106 | 0.111 | |
| G' 50%/G' 1% | 0.53 | 0.59 | (+11%) |
| Tensile Properties | | | |
| Tensile strength (MPa) | 18.8 | 21 | (+12%) |
| Elongation at break (%) | 695 | 685 | |
| 100% modulus (MPa) | 1.2 | 1.25 | |
| 300% modulus (MPa) | 4.25 | 5.05 | (+19%) |
| M300%/M100% ratio | 3.5 | 4 | (+14%) |
| Hardness, Shore A at 100° C. | 56 | 56 | |
| DIN Abrasion (volume loss, mm³) | 140 | 135 | |
| RSA at 11 Hz | | | |
| Tan delta at 0° C. | 0.138 | 0.138 | |
| Tan delta at 60° C. | 0.116 | 0.110 | (−5%) |

It is seen from Table 3 that tensile strength, modulus at 300 percent and the 300 percent/100 percent modulus ratio were higher for Sample Y than for the Control X. This is considered to be significant herein because it indicates improved silica reinforcement for the rubber composition for Sample Y.

It can also be seen from Table 3 that the tan delta at 60° C. physical property for Sample Y was similar to that of the Control Sample X. This is considered herein to be significant because a relatively low tan delta (for both Control Sample X and Sample Y) considered herein to be predictive of an acceptable rolling resistance (vehicular fuel economy) for a tire with a tread of such rubber composition.

While certain representative embodiments and details have been shown for the purpose of illustrating the invention, it will be apparent to those skilled in this art that various changes and modifications may be made therein without departing from the spirit or scope of the invention.

What is claimed:

1. A method for preparing an elastomer/silica composite comprised of at least one elastomer and a homogeneously dispersed silica reinforcement therein and an emulsion of oil and an organosilane polysulfide dispersed therein which comprises, based upon parts by weight of an ingredient per 100 parts by weight rubber:

(A) preparing a water dispersion of a composite formed by blending an aqueous colloidal silica slurry, rubber latex comprised of colloidal elastomer particles therein, and an emulsion of oil and an organosilane polysulfide by blending:

(1) an aqueous suspension of negatively charged colloidal silica aggregates which contains from about 10 to about 100 phr of silica aggregates therein, (2) an aqueous rubber latex which is comprised of water and colloidal particles of a diene-based rubber and which contains 100 phr of diene-based rubber colloidal particles therein, and (3) an oil emulsion of an organosilane polysulfide having from 2 to 6, with an average of from 2 to 2.6 or from 3.5 to 4, sulfur atoms in its polysulfidic bridge, which contains from 0.4 to about 4 phr of said organosilane polysulfide therein, wherein said organosilane component of said organosilane polysulfide is reactive with silanol groups contained on the surface of said silica aggregates, wherein the oil of said oil emulsion is chemically inert insofar as said organosilane polysulfide is concerned, wherein said oil emulsion protects said organosilane polysulfide from hydrolysis from exposure to the water of said aqueous emulsion of colloidal particles of said diene-based rubber, and (B) recovering said elastomer/silica composite by coagulation to form a rubber composite.

2. The method of claim 1 wherein said aqueous rubber latex is a latex of an elastomer selected from the group consisting of at least one of cis 1,4-polyisoprene elastomer particles, styrene/butadiene elastomer particles and cis 1,4-polybutadiene elastomer particle.

3. The method of claim 1 wherein said organosilane polysulfide is of the general formula (I):

$$(OR)_3\text{—Si—R'—S}_x\text{—R'—Si—}(OR)_3 \qquad (I)$$

wherein R is selected from the group consisting of at least one of methyl and ethyl radicals and R' is an alkylene radical having from 1 to 12 carbon atoms and x is a value of from 2 to 6 and an average of from 2 to 2.6 or from 3.5 to 4.

4. The method of claim 2 wherein said organosilane polysulfide is of the general formula (I):

$$(OR)_3\text{—Si—R'—S}_x\text{—R'—Si—}(OR)_3 \qquad (I)$$

wherein R is selected from the group consisting of the at least one of methyl and ethyl radicals and R' is an alkylene radical having from 1 to 12 carbon atoms and x is a value of from 2 to 6 and an average of from 2 to 2.6 or from 3.5 to 4.

5. The method of claim 3 wherein said organosilane polysulfide contains an average of from 2 to 2.6 sulfur atoms in its polysulfidic bridge.

6. The method of claim 3 wherein said organosilane polysulfide contains an average of from 3.5 to 4 sulfur atoms in its polysulfidic bridge.

7. The method of claim 3 wherein said organosilane polysulfide is a bis(3-triethoxysilylpropyl)polysulfide.

8. The method of claim 5 wherein said organosilane polysulfide is a bis(3-triethoxysilylpropyl)polysulfide.

* * * * *